Figure 1:
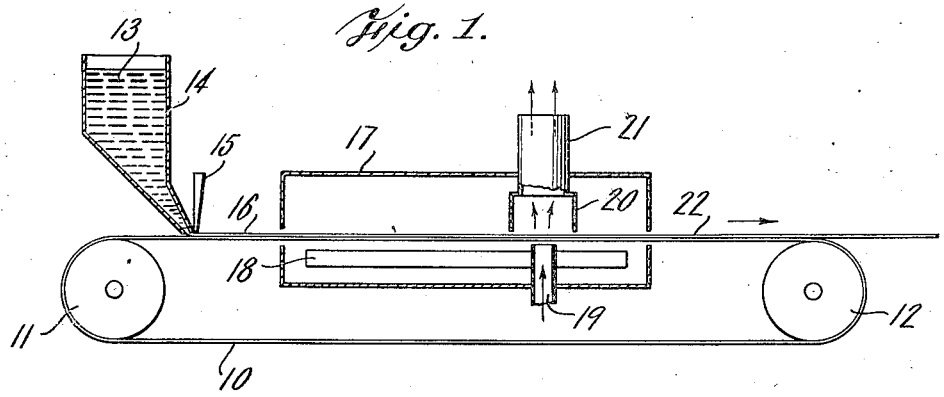

March 3, 1936.  R. W. ELDRIDGE  2,032,923

PROCESS FOR PRODUCING PERFORATE RUBBER ARTICLES

Original Filed June 21, 1933

Inventor
ROBERT W. ELDRIDGE
By his Attorney

Patented Mar. 3, 1936

2,032,923

UNITED STATES PATENT OFFICE 2,032,923

PROCESS FOR PRODUCING PERFORATE RUBBER ARTICLES

Robert W. Eldridge, Nutley, N. J., assignor, by mesne assignments, to United States Rubber Company, New York, N. Y., a corporation of New Jersey Application June 21, 1933, Serial No. 676,879
Renewed October 11, 1934

9 Claims. (Cl. 18—57)

This invention relates to a process for producing perforate rubber articles, and more particularly rubber films derived directly from latex and having predeterminately positioned perforations therethrough.

Sheet rubber containing predeterminately positioned perforations has been made by spreading latex onto a metal backing to dry and when at least partially dried or set impressing a patterned plate on the spread film to form the perforations corresponding to the impressions on the plate. Rubber sheetings containing perforations have also been made by spreading latex onto a suitably engraved plate, removing the latex from the relief parts of the plate by flowing or by the application of a squeegee, and then allowing the latex to dry. Instead of an engraved plate, a mold with suitably spaced projections on the surface has been used. It has further been suggested to use a metal or other electrical conducting sheet or mold with plugs or projections of insulating material for providing the desired projections in the finished sheet, and then electroplating a rubber film onto the backing sheet or mold in a known manner and drying the deposit to directly form the perforated sheeting. In all these processes, the perforations made in the rubber sheeting are necessarily relatively large by virtue of the limitations of the process of manufacture, and are easily visible to the naked eye. The patterned press plates of the first described process and the deposition backing for spreading or electroplating operations, as in the latter described processes, are further relatively expensive to manufacture.

Sponge-like and cellular rubber products have also been made from latex by drying latex compositions with air or gas entrapped in the latex itself. Such sponge-like rubber products may have pores interconnected throughout of a size as fine as desired, the mean size of the pores being more or less under the control of the operator, but the number and arrangement of the pores are outside the control of the operator. The sponge-like rubber products have a network of pores, in no sense of the word perforations, throughout similarly to ordinary sponge-rubber made by well known blowing agents in the conventional manner.

So-called micro-porous rubber products have also been made by setting latex to a gel in a mold of the desired shape, vulcanizing under non-evaporative conditions, and then removing the water.

The present invention relates to the production of perforate rubber films directly from a rubber composition, preferably a latex composition, wherein there are predeterminately and reproducibly positioned perforations of the desired size extending linearly through the thickness of the film or sheet, the number and arrangement of which perforations can be exactly reproduced as many times as desired in the manufacture of perforate rubber sheeting.

In carrying out the invention, a perforated deposition backing, having holes in the deposition surface as desired, is spread with a rubber composition, such as a latex composition, and heated to at least partially dry the rubber composition and set its shape, while a gas, such as air, is concurrently forced through the holes in the deposition backing and through the spread rubber composition to form permanent perforations in the rubber film corresponding to the holes in the backing. Depending on the size of the holes in the deposition backing, any desired sizes of perforations may be produced in the rubber film, from almost microscopic perforations to relatively large holes. The backing may be of any shape to produce the desired shape of perforate rubber film or article. In the production of perforate rubber sheeting, the backing may conveniently take the form of an endless belt as shown in the drawing.

Figure 2:
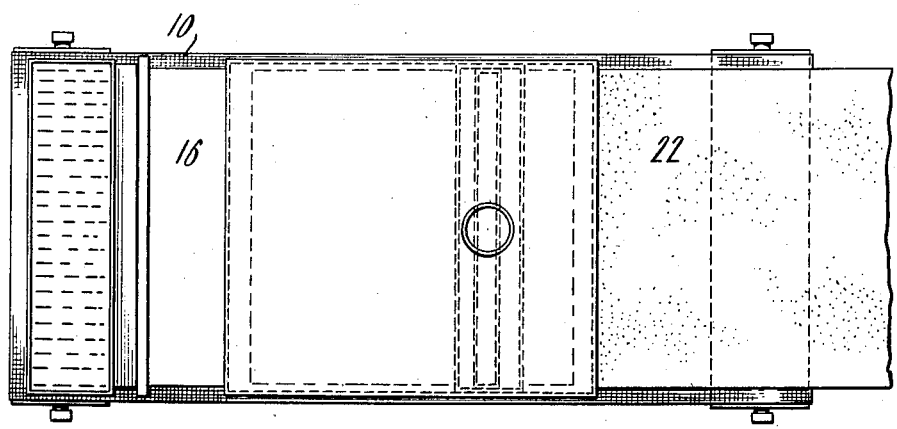

In the drawing:

Fig. 1 is a vertical view of the apparatus more or less diagrammatically illustrating the present invention, and Fig. 2 is a plan view of the apparatus of Fig. 1.

By way of illustration only, and without intention to unduly limit the invention, the manufacture of perforate rubber sheeting will be described in detail, it being obvious that articles of the desired shape, other than sheeting, may be made with the desired shape of permeable deposition backing.

For sheeting material the deposition backing may comprise a cloth or wire screen material which has been rubberized to produce a vulcanized rubber surface on the wire or threads of the screen or cloth without covering over the interstices between the woven strands. The cloth may, if desired, be woven directly from the rubberized cords. Vulcanized rubber on the individual woven structures is preferably superficially treated with a halogen to harden it and to make it non-adherent to the latex subsequently to be spread on it in the preparation of the perforate sheeting. The vulcanized surface may be halogenated and hardened by treatment with, for example, a 7½% solution of sulphur chloride in carbon tetrachloride, followed by a 2-3% solution of bromine in carbon tetrachloride, or with a bromine solution alone, or with a mixture of the two solutions.

On the perforated deposition backing or liner, as above described, is spread, for example, by means of a spreader bar, a coating of a rubber composition such as rubber latex, and the coated liner is passed through a heated drying tunnel or the like to dry the spread latex. As the backing with the spread latex on it passes through the drying tunnel, a gas such as air is forced through the deposition backing and through the drying latex film whereby perforations are formed which persist intact in the dried film or sheet. The spread latex should have a fairly high viscosity compared to that of normal latex, since the latex should not flow through the edges of the surface cavities in the deposition backing, and must also be thick enough when at least partially dried to maintain the perforations formed in the sheet by forcing the gas through the same.

The latex may be applied in various thicknesses depending on the viscosity of the latex and the size of the holes in the deposition backing. Several consecutive coatings may be spread on the liner to produce a perforate film or sheet of the desired thickness, each coating being thoroughly dried before the subsequent one is applied.

After the desired thickness of perforate sheeting has been built up on the liner or backing, and the final coating has been dried, the deposit is preferably stripped from the backing, and may be finished by dusting and vulcanizing, if desired.

The latex for the perforate film or sheet may be purified as by creaming or centrifuging, and compounded as desired, but should be of sufficient viscosity to maintain the perforations through the thickness of the film as they are formed and also to prevent the latex from flowing through the edges of the holes in the surface of the deposition backing when applied. The latex may be unvulcanized, with or without vulcanizing ingredients, or it may be prevulcanized. The latex may also alternatively be compounded to form hard rubber or ebonite, as is well known in the art.

Referring more particularly to the drawing, Figs. 1 and 2 illustrate more or less diagrammatically, an apparatus for producing perforate sheet material, wherein 10 represents the deposition backing or liner which is made of a screen or cloth, preferably with the woven strands rubberized as above described. The deposition backing or liner 10 in the form of an endless belt passing around pulleys 11 and 12, is driven by mechanical means, not shown.

The latex 13 is spread on to the travelling deposition backing or liner from a reservoir 14 by means of a spreader bar 15 forming a film 16 on the backing, which film spreads on the backing without penetrating through the holes between the woven strands. The backing spread with the desired thickness of the latex passes through a dryer 17 shown conventionally with a heating unit 18 below the travelling deposition backing. As the coated backing passes through the dryer, the spread latex film dries, and, concurrently, sufficient air pressure is maintained against at least a portion of the under side of the backing to cause air to be blown through the deposition backing and the partially dried latex film, in the directions shown by the arrows of Fig. 1, by means of a blowing device 19 under the deposition backing from a source not shown, the gas being forced through the backing and the film to form the perforations on the latter, and exiting from the dryer 17 through the casing 20, of the width of the dryer, and the stack 21. As the film leaves the drier as shown at 22, it will have the desired perforations extending linearly through the thickness of the sheet. Fig. 1 shows the film 22 formed by one spreading operation being stripped from the deposition backing in a continuous manner. As described above, several spreading operations may be performed and then the film of the desired thickness may be cut and stripped from the deposition backing.

Sheets and other articles may be produced according to the present invention by forming a perforated deposition backing of the desired shape and having the desired number and sizes of perforations in it which may be exactly reproduced in the finished rubber film. For producing dipped articles according to the present invention, hollow perforate forms, for example, may be dipped in latex followed by drying while a slight air pressure is maintained inside the form to form the permanent perforations in the latex deposit and to maintain them intact until the latex is sufficiently dry to be incapable of flowing.

With the detailed disclosure of the invention, it is evident that numerous modifications will suggest themselves to those skilled in the art, and it is not desired to limit the invention otherwise than as set forth in the appended claims.

Having thus described my invention, what I claim and desire to protect by Letters Patent is:

1. A process for producing rubber films or sheets having predeterminately positioned perforations therethrough comprising spreading a rubber composition on a perforated deposition backing or form having holes in the deposition surface as desired through which a gas may be forced, concurrently drying the spread rubber composition and forcing a gas through said holes and through the rubber composition to form permanent perforations in the rubber film or sheet, and stripping the perforate rubber film or sheet from the deposition backing or form.

2. A process for producing rubber films or sheets having predeterminately positioned perforations therethrough comprising spreading a rubber composition on a perforated deposition backing or form having holes in the deposition surface as desired through which a gas may be forced, heating the spread rubber composition and forcing a gas through said holes and through the rubber composition to form permanent perforations in the rubber film or sheet, and stripping the perforate rubber film or sheet from the deposition backing or form.

3. A process for producing rubber films or sheets having predeterminately positioned perforations therethrough comprising spreading a rubber composition on a perforated deposition backing or form having holes in the deposition surface as desired through which a gas may be forced, at least partially drying the spread rubber composition at an elevated temperature and forcing a gas through the rubber composition to form permanent perforations in the rubber film or sheet, and stripping the perforate rubber film or sheet for the deposition backing or form.

4. A process for producing rubber films or sheets having predeterminately positioned perforations therethrough comprising spreading a latex composition on a perforated deposition backing or form having holes in the deposition surface as desired through which a gas may be forced, drying the spread latex composition and forcing a gas through said holes and through the latex composition to form permanent perforations in the rubber film or sheet, and stripping the perforate rubber film or sheet from the deposition backing or form.

5. A process for producing rubber films or sheets having predeterminately positioned perforations therethrough comprising spreading a latex composition on a perforated deposition backing or form having holes in the deposition surface as desired through which a gas may be forced, heating the spread latex composition and forcing a gas through said holes and through the latex composition to form permanent perforations in the rubber film or sheet, and stripping the perforate rubber film or sheet from the deposition backing or form.

6. A process for producing rubber films or sheets having predeterminately positioned perforations therethrough comprising spreading a latex composition on a perforated deposition backing or form having holes in the deposition surface as desired through which a gas may be forced, at least partially drying the spread latex composition at an elevated temperature and forcing a gas through the latex composition to form permanent perforations in the rubber film or sheet, and stripping the perforate rubber film or sheet from the deposition backing or form.

7. A process for producing rubber films or sheets having a plurality of perforations therethrough comprising applying a latex composition on a perforated deposition backing or form, maintaining perforations in the latex composition in register with the perforations in the backing, and coagulating the latex to form permanent perforations in the rubber film or sheet, and stripping the perforate rubber film or sheet from the deposition backing or film.

8. A process for producing rubber films or sheets having a plurality of perforations therethrough comprising applying a latex composition on a perforated deposition backing or form without webbing over the perforations thereof, and coagulating the latex to form permanent perforations in the rubber film or sheet, and stripping the perforate rubber film or sheet from the deposition backing or film.

9. A process for producing rubber films or sheets having a plurality of perforations therethrough comprising applying a latex composition on a perforated deposition backing or form without webbing over the perforations thereof, treating the applied composition to keep it free from such webbing, drying the latex to form permanent perforations in the rubber film or sheet, and stripping the perforate rubber film or sheet from the deposition backing or form.

ROBERT W. ELDRIDGE.